March 24, 1931. N. H. VIGUS 1,797,596

LUGGAGE CARRIER FOR VEHICLES

Filed Jan. 16, 1930

INVENTOR.
Nicholas H. Vigus

BY

ATTORNEYS.

Patented Mar. 24, 1931

1,797,596

UNITED STATES PATENT OFFICE

NICHOLAS HENRY VIGUS, OF TACOMA, WASHINGTON

LUGGAGE CARRIER FOR VEHICLES

Application filed January 16, 1930. Serial No. 421,276.

The present invention relates to luggage carriers for attachment to motor vehicles and particularly to that type of motor vehicle known as the "Model A Ford" such as shown and described in the publication "The New Ford" copyrighted 1928 by Ford Motor Company, Detroit, Michigan.

The primary object of the invention is to provide an improved luggage carrier for motor vehicles adapted to be applied to the rear of the vehicle in a manner whereby the device will not interfere with the spare wheel when in an operative position, and may be disposed compactly adjacent the spare wheel when not in use so as to afford full protection by the rear bumpers of the vehicle.

A further object of the invention resides in the provision of an improved luggage carrier embodying a pivoted rack which is readily detachable and when in a lowered operative position forms a rigid and substantial support for the luggage.

A further object of the invention resides in the novel construction of the supporting brackets whereby the carrier may be attached to the bumper supporting arms without interfering with the spare wheel and without requiring any alterations being made to the vehicle, the brackets being rigidly held in position thru the mere substitution of slightly longer bolts for the bolts serving to ordinarily attach the bumpers to the bumper supporting arms.

A still further object resides in the provision of a luggage carrier adapted for attachment to a "Model A Ford" which when in a raised or inoperative position will be protected by the rear bumpers of the vehicle.

Other objects and advantages of the invention will be apparent during the course of the following detailed description, taken in connection with the accompanying drawing forming a part of this specification and in which drawing.

Figure 1:
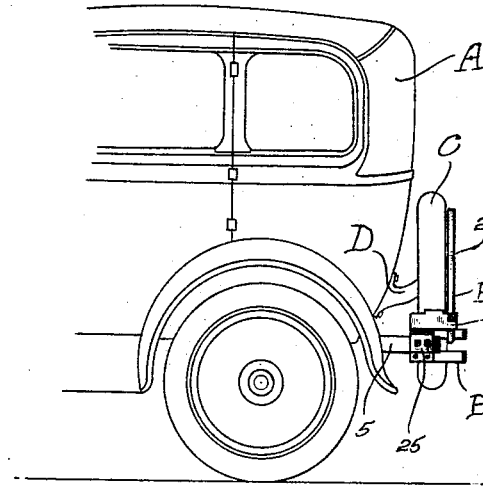
Figure 1 is a fragmentary side elevation of the rear portion of a motor vehicle of the type specified and showing the carrier applied and the rack in a raised position against the spare wheel, with portions of the bumper broken away for illustrating details of the mounting.
Figure 4:
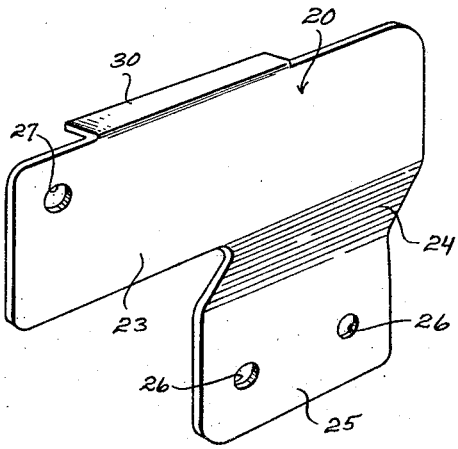
Figure 4 is an enlarged perspective view of one of the attaching brackets for the pivoted rack.

In the drawing, and wherein similar reference characters designate corresponding parts thruout the several views, the letter A may designate a motor vehicle of the "Model A Ford" type provided with the rear bumpers B between which a spare wheel C is mounted upon a bracket D, and E designates the improved luggage carrier for attachment to the rear of the vehicle.

The bumpers B, one of which is mounted adjacent each side of the vehicle, are attached to the vehicle by means of bumper supporting arms 5 which extend in a line longitudinally of the vehicle for a distance rearwardly of the vehicle body and are then bent outwardly toward opposite sides of the vehicle to form bumper braces 6. Connecting and bracing the supporting arms 5 is a spacer rod 7 which is provided at each end with rearwardly extending angle plates 8 which extend along the inner or confronting surfaces of the supporting arms.

The bumpers B further each include a pair of bumper arms 10 which at their inner ends are connected in spaced apart overlying relation by means of a tie plate 11 to which the bumper arms are riveted as by rivets 12. From the tie plate 11 the bumper arms 10 extend rearwardly and then outwardly in substantially S formation and are connected intermediate their ends by means of a clamp 12' to the inturned end of the brace 6. The tie plates 11 are disposed at the inner side of the angle plates 8 and in practice, two bolts as indicated at 15 are extended thru aligning apertures in the portions 5, 8 and 11 whereby the tie plates carrying the bumper arms are rigidly secured to the bumper supporting arms.

Referring now to the carrier E, the same includes a pair of mounting brackets 20 one of which is intended to be mounted upon each of the bumpers B, and a rack 22 for pivotal and detachable connection with the brackets 20. It may here be well to note that the bumper arms 10 are connected to the bumper supporting arms 5 at positions in alignment with opposite sides of the spare wheel C.

Figure 2:
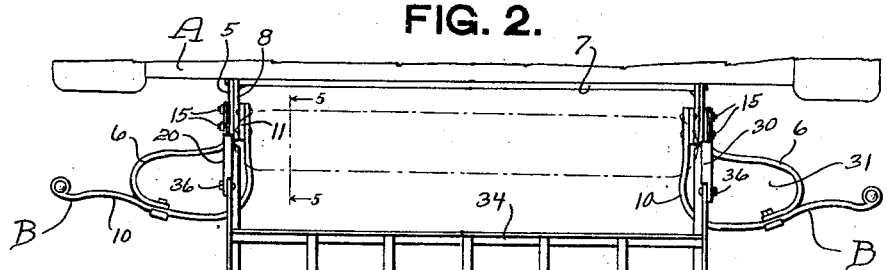
Figure 2 is an enlarged top plan view showing the carrier mounted and in a lowered operative position.

Referring first to the specific construction of the mounting brackets 20, the same may be formed of sheet metal stampings and are constructed in pairs of right and left for attachment to the respective bumpers of the vehicle. Each bracket 20 is formed with an elongated plate portion 23 connected along the rear portion of its lower edge by an angularly offset portion 24 with an attaching plate portion 25. Thru the manner of attachment of the brackets to the bumpers, the offset 24 may be considered as offsetting the main plate portion 23 outwardly of the attaching plate portion 25. This outwardly offsetting of the elongated main plate portion 23 gives clearance for the spare wheel C and further acts to stiffen the carrier against side swaying. The plate portion 25 of each bracket is provided with two bolt receiving openings 26 for attachment of the brackets to the bumpers in a manner to be subsequently explained. The main plate portion 23 adjacent its forward and upper edge is provided with a single circular opening 27 for pivotal mounting of the rack 22 upon the mounting brackets. Bent inwardly from the upper edge of the plate 23 with its rear end spaced forwardly of the opening 27 and having its forward end terminating short of the opposite end of the plate is a stop flange 30 which co-acts with portions of the rack 22 for supporting the rack in a horizontal article receiving position. The elongated main plate portions 23 are of such length that when the brackets are applied to the bumpers the apertures 27 of the brackets will axially align at a point spaced slightly rearward from the spare wheel C. With this arrangement, the brackets will support the luggage carrier in such a manner that it will not interfere with the spare wheel and permits the rack to be disposed compactly adjacent the spare wheel when not being used. In Figures 1 and 2 it will be noted that the plate portions 23 terminate above the openings 31 formed by the braces 6 and bumper arms 10 so that the rack when in a raised position against the spare wheel will be fully protected by the bumper arms.

Figures 3, 5:
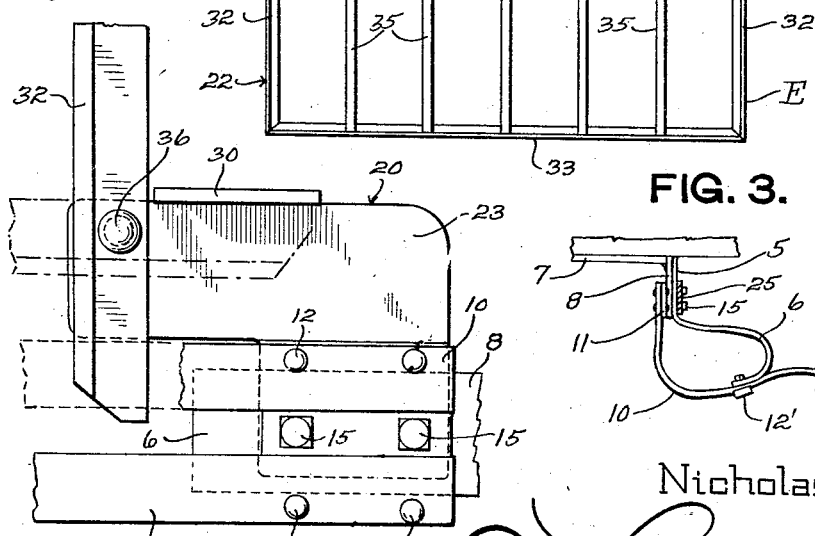
Figure 3 is a horizontal sectional view thru one of the attaching brackets directly above its point of connection to the bumper supporting arm.
Figure 5 is an enlarged fragmentary view substantially at the point 5—5 in Figure 2 and showing the rack arm raised.

Referring now to the specific formation of the rack 22, the same is formed relatively flat and embodies a rectangular-shaped frame including a pair of side arms 32 connected at their outer ends by a rear cross rail 33 and at a point spaced from the inner ends of the side arms by a cross rail 34. The arms 32 and rails 33 and 34 may be formed from angle iron arranged with the upstanding flange portions outermost of the rack. The rails 33 and 34 may be connected at a number of points by suitable bars 35 secured in any preferred manner at their ends to the rails. The upstanding flanges of the side arms 32 are each apertured at a point between the rail 32 and inner end of the arms for removably receiving pivot bolts 36 extended thru the openings 27 in the brackets 20 whereby the arms are pivotally mounted upon the inner or confronting sides of the brackets. This mounting of the rack upon the brackets causes the inner end of the arms 32, when the rack is lowered, to engage beneath the inwardly offset flanges 30 as shown by dotted lines in Figure 5 for supporting the rack in a horizontal position ready for use. With the pivot bolts 36 disposed rearwardly of the rear end of the stop flanges 30 it will be noted in Figure 5 that such will permit of the rack being raised to a vertical position adjacent the spare wheel with the inner ends of the side arms 32 depending into the space 31 between the bumper braces and bumper arms.

In attaching the improved luggage carrier to the bumpers it is merely necessary to remove the usual bumper mounting bolts 15 and substitute slightly longer bolts for these bolts for mounting of the brackets 20. The brackets 20 are mounted with the attaching plates 25 arranged over the outer surface of the bumper supporting arms 5 and the bolts are inserted thru the openings 26 so that the bolts aside from attaching the brackets also serve for connecting the bumper arm carrying tie plates to the bumper supporting arms. Thus it will be seen that the improved luggage carrier may be readily applied to the vehicle bumpers thru the mere substitution of slightly longer bolts for the bumper mounting bolts and without requiring any alterations to the usual construction of the bumpers.

The rack 22 may be readily detached from the brackets 20 thru merely removing the pivot bolts 36, and these pivot bolts may also be used for retaining the rack in an upright position against the spare wheel by merely tightening the nuts of the bolts against the bracket plates 23.

Thus it will be seen that the specific formation of the mounting brackets and manner of attaching the rack to the brackets affords ample room for the spare wheel and permits of the rack to be disposed in a bumper protected position adjacent the spare wheel when the rack is raised.

While the luggage carrier may have general use, the same is primarily intended for use upon bumper constructions of that type disclosed in the booklet entitled "The New Ford" copyrighted 1928 by Ford Motor Company, Detroit, Michigan.

Changes in detail may be made to the form of invention herein shown and described, without departing from the spirit of the invention or the scope of the following claims.

I claim:

1. In a luggage carrier, the combination with a rear bumper structure including a pair of supporting arms, and bumper bars supported by the arms, of a bracket for attachment to each supporting arm and each embodying a rearwardly extending mounting plate, an inwardly turned stop flange provided at the upper edge of each plate, a rack including side arms disposed inwardly of each plate, and means pivotally connecting the arms to the rear end of the plate whereby the arms are engageable with the stop flanges for supporting the rack in a horizontal position above the bumper bars.

2. In combination with a bumper structure including a pair of bumper supporting arms and bumper bars supported by the arms, a bracket for attachment to each supporting arm each including an attaching plate and an outwardly offset mounting plate projecting rearwardly beyond the attaching plate, a stop flange at the upper edge of each mounting plate, a rack including side arms, and means pivotally connecting the arms to the inner sides of the mounting plates rearwardly of the rear end of the stop flanges with the end portions of the arms adapted to engage beneath the flanges for supporting the rack in a horizontal position above the bumper bars.

3. In combination with a rear bumper structure including a pair of bumper supporting arms having brace portions, and bumper bars attached to the supporting arms and brace portions, bolts removably connecting the bumper bars to the supporting arms, a bracket for attachment to each bumper supporting arm by said bolts and each embodying an outwardly offset mounting plate projecting rearwardly from the attaching plate, a stop flange formed along the upper edge of each mounting plate and terminating short of the ends thereof, a rack including side arms extending at the confronting faces of the mounting plates, and means for pivotally connecting the arms at a point spaced from the inner ends of the arms to the mounting plates rearwardly of the stop flanges.

4. In combination with a rear bumper structure including a pair of bumper supporting arms, a bumper bar for each arm, and bolts removably coupling the bars to the arms, a carrier for detachable connection with the bumper structure comprising a pair of brackets each including an attaching plate for connection with the supporting arms by said bolts an elongated outwardly offset mounting plate projecting rearwardly beyond the attaching plate, and an inwardly offset stop flange formed along a portion of the upper edge of each mounting plate, a rack including a pair of side arms, and means pivotally connecting the side arms to the inner sides of the mounting plates at a point rearwardly of the stop flanges.

5. In a luggage carrier for vehicles, mounting brackets each including a flat attaching plate portion, a flat mounting plate portion offset outwardly above the attaching plate portion and projecting rearwardly therefrom, an inwardly turned stop flange along the upper edge of each mounting plate portion and terminating short of the ends thereof, and a rack including side arms pivotally secured to the inner sides of the mounting plates rearwardly of the stop flanges.

6. In a luggage carrier for vehicles, a mounting bracket including a flat attaching plate being apertured for mounting of the bracket, an elongated flat mounting plate portion offset outwardly from the attaching plate portion and projecting rearwardly therefrom, and an inwardly turned stop flange along a portion of the upper edge of the mounting plate portion and terminating inwardly of the ends thereof, said mounting plate portion being apertured forwardly of the stop flange.

7. A luggage carrier for attachment to the rear bumper structure of a vehicle comprising a pair of mounting brackets each including a flat attaching plate and an outwardly offset mounting plate above the attaching plate, an inwardly turned stop flange along the upper edge of each mounting plate and terminating short of the ends thereof, a rack including side arms, and means pivotally connecting the side arms to the inner sides of the mounting plate rearwardly of the stop flanges.

NICHOLAS HENRY VIGUS.